United States Patent
Tachikawa et al.

(10) Patent No.: US 6,577,588 B1
(45) Date of Patent: Jun. 10, 2003

(54) OPTICAL RECORDING MEDIUM HAVING TRANSPARENT COLOR INK FORMED ON THE REFLECTIVE LAYER

(75) Inventors: Kimiko Tachikawa, Tokyo (JP); Kazuaki Taga, Tokyo (JP); Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/398,425

(22) Filed: Sep. 17, 1999

(30) Foreign Application Priority Data

Sep. 30, 1998 (JP) ............................................. 10-279154

(51) Int. Cl.$^7$ ................................................. G11B 7/24
(52) U.S. Cl. ..................... 369/275.1; 369/274; 428/64.4
(58) Field of Search ............................... 369/275.1, 274, 369/272, 273, 280; 428/64.1, 64.4; 430/320, 321

(56) References Cited

U.S. PATENT DOCUMENTS

| | | | | |
|---|---|---|---|---|
| 4,903,255 A | * | 2/1990 | Sugaya et al. .............. 369/284 |
| 5,058,098 A | * | 10/1991 | Sakaue et al. .............. 369/284 |
| 5,317,337 A | * | 5/1994 | Ewaldt ........................... 347/2 |
| 5,470,691 A | * | 11/1995 | Arai et al. ................. 430/273.1 |
| 5,748,607 A | * | 5/1998 | Ohira et al. ............... 369/275.4 |
| 5,805,563 A | | 9/1998 | Nakano ..................... 369/275.1 |
| 5,920,329 A | * | 7/1999 | Arai et al. ...................... 347/2 |
| 6,088,323 A | * | 7/2000 | Kobayashi et al. ...... 369/275.3 |

FOREIGN PATENT DOCUMENTS

| | | |
|---|---|---|
| EP | A1 0 516 907 | 12/1992 |
| EP | A2 0 652 555 | 5/1995 |
| EP | A2 0 849 728 | 6/1998 |

* cited by examiner

*Primary Examiner*—Tan Dinh
(74) *Attorney, Agent, or Firm*—Sughrue Mion, PLLC

(57) ABSTRACT

An optical data storage medium comprises a substrate having thereon concavities and convexities so that diffraction of reflected light is caused; a reflective layer having a high regular reflectance; and a colored region which is provided by applying transparent coloring ink to the reflective layer so that the regular reflectance of the reflective layer on the side opposite to the substrate side falls within a range of from 3 to 80%. The external appearance of the optical data storage medium provides a visual effect utilizing metallic gloss and light-diffraction-based iridescent reflection characteristics which result from the reflective layer provided on the substrate having concavities and convexities.

17 Claims, 3 Drawing Sheets

OPTICAL RECORDING MEDIUM HAVING TRANSPARENT COLOR INK FORMED ON THE REFLECTIVE LAYER

BACKGROUND OF THE INVENTION

1. Field of the Invention

The present invention relates to an optical data storage medium comprising a reflective layer having thereon a print made by utilizing the metallic gloss and light diffraction of the reflective layer thereof.

2. Description of the Related Art

Optical data storage media for use in recording and reproduction by means of laser light or the like are called optical disks, and among optical disks, compact disks which are used for audio reproduction are well known. A compact disk comprises a plastic transparent substrate having thereon spiral pits formed by injection molding, and a reflective layer which is made of a metal and provided on the substrate. The information is read by illuminating with laser light the disk as it rotates.

In recent years, an write-once type recordable optical data storage medium has also been put to practical use. The write-once type recordable optical data storage medium comprises a plastic transparent substrate, and a recordable layer and a reflective layer provided on the substrate in that order. Recording of information is performed by utilizing a physical or chemical change of the recordable layer which is caused by the irradiation with laser light, and reading out of the recorded information is also performed by the irradiation with laser light. On these optical disks, grooves in spirals having a narrow pitch width are provided by injection molding for the purpose of tracking the laser light for recording/reproduction.

Since an optical disk has in the inside thereof a reflective layer made of a highly reflective metal, the optical disk has a metallic gloss when viewed from the exterior. Further, since the light-diffracting effect due to the spiral pits or grooves causes the light to be reflected in angular directions corresponding to wavelengths, the optical disk has iridescent shimmer depending on the angle at which it is viewed.

However, in the case of a commercially available optical disk, a label or the like is already printed on the front surface, and ink such as a pigment-based ink, which has a high light-diffusing effect, is used in the printing. Consequently, in a conventional optical disk, only the side on which the recording/reproducing light is incident has the above-mentioned iridescent shimmer. Therefore, it has not been possible to utilize, as a feature of the external appearance, the peculiar reflection characteristics inherent to the structure of the optical disk.

SUMMARY OF THE INVENTION

With the foregoing in view, an object of the present invention is to provide an optical data storage medium having an excellent visual effect by utilizing, but not impairing, the metallic gloss and light-diffraction-based iridescent reflection characteristics caused by a reflective layer provided on a substrate having concavities and convexities.

After intense studies, the present inventors found that the application of transparent coloring ink such that the regular reflectance of the front surface of an optical disk falls within a specific range does not impair the metallic gloss and the iridescent reflection characteristics which is caused by light diffraction. Based on this discovery, the present inventor achieved the present invention.

The optical data storage medium of the present invention comprises: a substrate having thereon concavities and convexities so that diffraction of reflected light is caused; a reflective layer provided on the side of the substrate which side has the concavities and convexities; and a colored region which is provided by applying a transparent coloring ink to at least a region of the reflective layer, the regular reflectance in the colored region with respect to light incident from the side opposite to the substrate side being within a range of from 3 to 80%.

In another aspect of the presennt inventions, the optical data storage medium comprises: a substrate having thereon concavities and convexities so that diffraction of reflected light is caused; a reflective layer provided on the side of the substrate which side has the concavities and convexities; a protective layer provided on the reflective layer; and a colored region which is provided by applying a transparent coloring ink to at least a region of the protective layer, the regular reflectance in the colored region with respect to light incident from the side opposite to the substrate side being within a range of from 3 to 80%.

Average regular reflectance of the colored region with respect to light incident from the side opposite to the substrate side and having wavelengths ranging from 400 to 700 nm is preferably 10% or more.

The concavities and convexities are preferably formed by grooves which are provided in concentric circles and have an average pitch of 0.1 to 50 μm and an average depth of 10 to 5000 nm.

The regular reflectance in the colored region with respect to light incident from the side opposite to the substrate side can be controlled by controlling the coating amount of the transparent coloring ink. Further, the wavelength spectrum of the light reflected in the colored region with respect to light incident from the side opposite to the substrate side can be controlled by changing the absorption of the transparent coloring ink. It is also possible to control the wavelength spectrum of the light reflected in the colored region with respect to light incident from the side opposite to the substrate side by using as the transparent coloring ink two or more transparent coloring inks each having different absorption and applying the transparent coloring inks as plural coast.

It is preferable that a UV-curable ink is used as the transparent coloring ink.

In yet another aspect of the present inventions, the optical data storage medium comprises: a substrate having thereon concavities and convexities so that diffraction of reflected light is caused; a recording layer which is writable by light and which is provided on the side of the substrate which side has the concavities and convexities; a reflective layer provided on the recording layer; and a colored region which is provided by applying a transparent coloring ink to at least a region of the reflective layer, the regular reflectance in the colored region with respect to light incident from the side opposite to the substrate side being within a range of from 3 to 80%.

It is preferable that recording layer is a recording layer based on a dye.

DETAILED DESCRIPTION OF THE PREFERRED EMBODIMENTS

Figure 1:
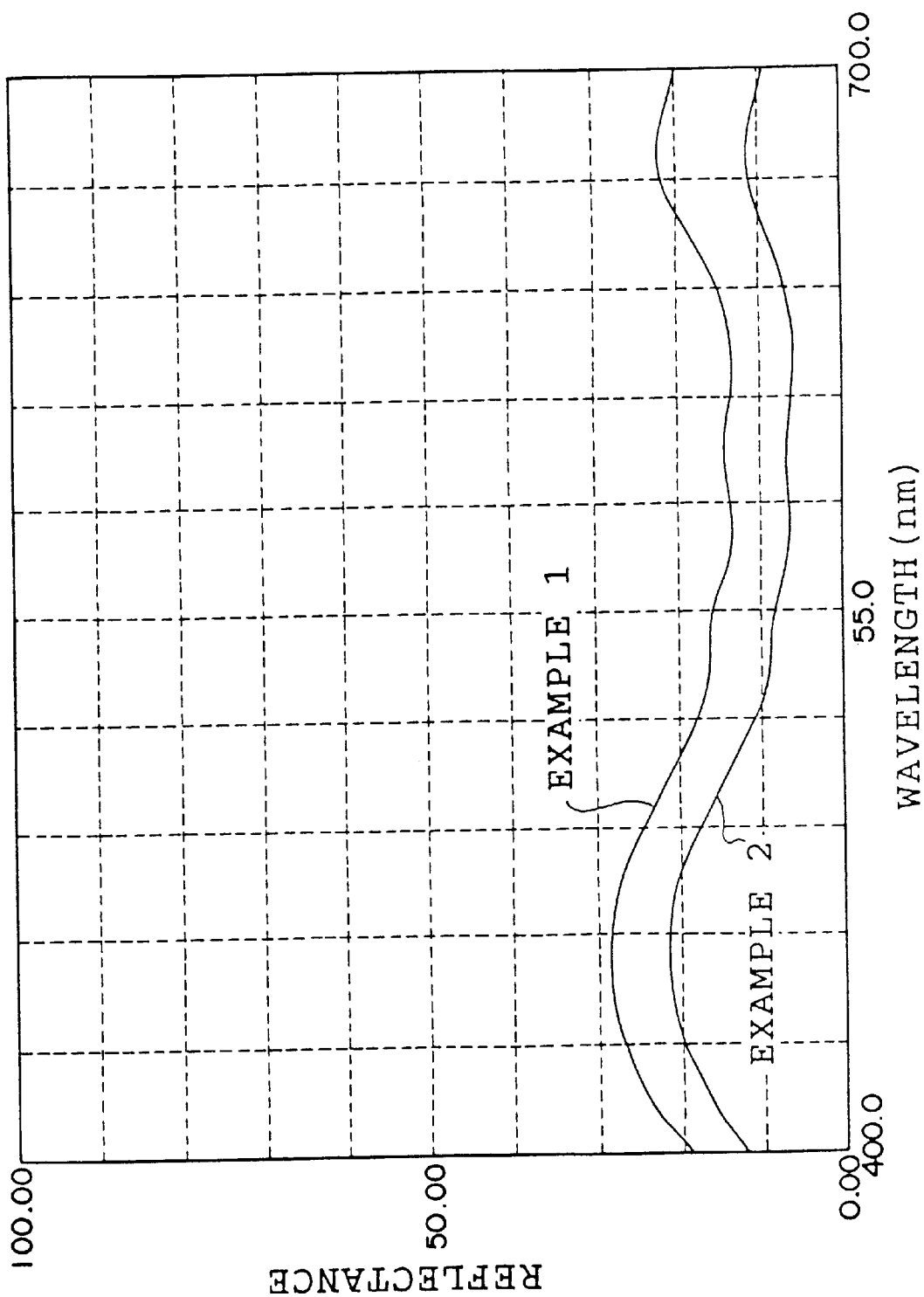
FIG. 1 is a graph illustrating the regular reflectance of an optical data storage medium of the present invention.

The optical data storage medium of the present invention is described in detail hereinafter.

The optical data storage medium of the present invention comprises a substrate having thereon a reflective layer, wherein the surface of the reflective layer, which surface is opposite to the substrate side and is hereinafter referred to as the "front surface" on occasion, is coated with transparent coloring ink so that the regular reflectance of the surface falls within a specific range. As to the optical disk itself, an ordinary optical disk, which comprises a discoid transparent resin substrate having thereon a reflective layer and optionally a recording layer and a protective layer laminated thereon, can be used.

Guide grooves for tracking or concavities and convexities (pregrooves) indicating such information as address signals are formed on the substrate. In order to obtain a remarkable diffractive effect, the average pitch of the pregrooves is preferably 0.1 to 50 μm, more preferably 0.2 to 30 μm, and most preferably 0.3 to 10 μm. The average depth of the pregrooves is preferably 10 to 5000 nm, more preferably 30 to 3000 μm, and most preferably 50 to 1000 μm.

Examples of the material for use as the substrate include polycarbonate; acrylic resins such as polymethyl methacrylate and the like; vinyl chloride-based resins such as polyvinyl chloride, copolymers of vinyl chloride, and the like; epoxy resins; amorphous polyolefins; glass; and polyesters. These materials may be used in combinations if desired. Among the materials listed above, amorphous polyolefins and polycarbonate are preferable, and, in particular, polycarbonate is preferable, from the standpoints of moisture resistance, dimension stability, cost, and others.

For the purpose of increasing reflectance, a reflective layer is provided on the substrate. When a recordable layer is provided, the reflective layer is provided as a part of the recordable layer. However, in the optical data storage medium of the present invention, the reflective layer is provided in order to obtain a metallic gloss and iridescent reflection characteristics even if the recordable layer is not provided.

The light-reflective substance which is a material for forming the reflective layer is a substance having a high reflectance with respect to laser light. The reflectance of the material is preferably 30% or more, more preferably 50% or more, and most preferably 70% or more. The reflectance of the material means a regular reflectance of the material as a film formed on a flat surface. Examples of the substance include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi, and stainless steel. Among these substances, Cr, Ni, Pt, Cu, Ag, Au, Al, and stainless steel are preferable. These substances may be used singly or in a combination of two or more, or alternatively as alloys. Au, Ag, Al, and alloys thereof are particularly preferable. The reflective layer can be formed by, for example, vapor-deposition, sputtering, or ion-plating of the above-mentioned reflective substance on the substrate or on the recording layer. The layer thickness of the reflective layer is generally in range of from 10 to 800 nm, preferably in the range of from 20 to 500 nm, and more preferably in the range of from 50 to 300 nm.

Before being coated with transparent coloring ink, the average regular reflectance of the front surface with respect to light having wavelengths ranging from 400 to 700 nm is preferably 10% or more, more preferably 20% or more, and most preferably 30% or more. If the average regular reflectance is 10% or less, the light-diffractive effect cannot be visually discerned.

In the present invention, printing is performed by applying a transparent coloring ink to the front surface. The region, coated with the transparent coloring ink, of the front surface must have an average regular reflectance within a range of from 3 to 80% with respect to light having wavelengths ranging from 400 to 700 nm in order not to impair the metallic gloss and the light-diffracting-effect based iridescent reflection characteristics of the optical disk itself. If the average regular reflectance is less than 3%, the metallic gloss of the material itself cannot be fully utilized. On the other hand, if the average regular reflectance exceeds 80%, the average regular reflectance is too large, and therefore, the amount of diffracted light is so small that the iridescent reflection characteristics cannot be visually recognized. The lower limit of the average regular reflectance is preferably 7% or more and more preferably 13% or more. On the other hand, the upper limit of the average regular reflectance is preferably 60% or less and more preferably 50% or less.

In the present invention, the transparent coloring ink means inks other than inks such as pigment-based inks having a high light-diffusing property and a regular reflectance of approximately zero (hereinafter referred to as "opaque inks" on occasion). Also excluded from the transparent coloring ink of the present invention are colorless transparent inks. The transparent coloring ink in the present invention is preferably a UV-curable ink.

The regular reflectance in the region coated with the transparent coloring ink can be adjusted by the type, the coating amount, and the like of the transparent coloring ink. Even when single-color ink is used, the depth of color can be varied by changing the coating amount.

The transparent coloring ink does not need to be applied to the entire surface. Accordingly, within the surface of a single disk, regions coated with transparent coloring ink and regions not coated with transparent coloring ink m ay be produced to thereby form a pattern. Alternatively, regions coated with transparent coloring ink and a region coated with opaque ink may be provided to thereby retain the metallic gloss and iridescent reflection characteristics only at portions of the surface.

The wavelength spectrum of the reflected light on the front surface can be controlled by changing the absorption of the transparent coloring ink. It is also possible to control the wavelength spectrum of the reflected light on the front surface by using as the transparent coloring ink two or more transparent coloring inks having different absorption and applying these inks as separate coats so as to apply plural coats. For example, if a region coated with yellow ink is coated over with blue ink, the overlapped region is colored green as a result of subtractive color amalgamation. The use of such color amalgamation makes it possible to realize multicolor printing by using a number of printing inks less than the number of the colors. Therefore, the printing process can be simplified and the printing cost can be reduced.

The optical data storage medium of the present invention may include a recordable layer, if needed. Although the type of the recording medium is not limited, preferred is a recordable layer based on a dye, a recording layer based on phase change, and a recording layer based on photomagnetism. More preferred are a recording layer based on a dye.

The dye to be used in the recording layer based on a dye is not particularly limited. Examples of dyes which can be used include cyanine-based dyes, phthalocyanine-based dyes, imidazoquinoxaline-based dyes, pyrylium-thiopyrylium-based dyes, azulenium-based dyes, squalylium-based dyes, dyes based on metal complex salts of Ni, Cr, and the like, naphthoquinone-based dyes, anthraquinone-based dyes, indophenol-based dyes, indoaniline-based dyes, triphenylmethane-based dyes, merocyanine-based dyes, oxonol-based dyes, aluminum-diimmonium-based dyes, and nitroso compounds.

A solution prepared by dissolving a dye in a suitable solvent is used as the coating liquid. The concentration of the dye in the coating liquid is generally 0.01 to 15% by weight, preferably 0.1 to 10% by weight, and most preferably 0.5 to 3% by weight.

Examples of the solvent for use in the coating liquid to form the recordable layer based on a dye include esters such as butyl acetate and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as cyclohexane; ethers such as tetrahydrofuran, ethyl ether, and dioxane; alcohols such as ethanol, n-propanol, i-propanol, n-butanol, and diacetone alcohol; fluorine-containing solvents such as 2,2,3,3-tetrafluoropropanol; and glycol ethers such as ethylene glycol monomethyl ether, ethylene glycol monoethyl ether, and propylene glycol monomethyl ether. These solvents may be used singly or in a combination of two or more by taking into consideration the solubility of the dye to be used. Preferred for use is a fluorine-containing solvent such as 2,2,3,3-tetrafluoropropanol. If desired, the coating liquid may contain a fading preventing agent or a binder. Further, according to the purpose, the coating liquid may contain additives such as an antioxidant, a UV absorber, a plasticizer, a lubricating agent, and the like.

Typical examples of the fading preventing agent include a nitroso compound, a metal complex, a diimmonium salt, and an aminium salt. These examples are described in, for example, Japanese Patent Application Laid-Open (JP-A) Nos. 2-300288, 3-224793, and 4-146189.

Examples of the binder include naturally occurring organic polymeric substances such as cellulose derivatives, dextran, rosin, and rubber; as well as synthetic organic polymers, for example, hydrocarbon-based resins such as polyethylene, polypropylene, polystyrene, and polyisobutylene; vinyl-based resins such as polyvinyl chloride, polyvinylidene chloride, and vinyl chloride/vinyl acetate copolymers; acrylic resins such as polymethyl acrylate and polymethyl methacrylate; polyvinyl alcohol; chlorinated polyethylene; epoxy resins; butyral resins; rubber derivatives; and initial-stage condensation products of thermosetting resins such as phenol/formaldehyde resins. If a binder is used, the amount to be used is generally 20 parts by weight or less, preferably 10 parts by weight or less, and more preferably 5 parts by weight or less, based on 100 parts by weight of the dye.

The thickness of the recordable layer based on a dye is generally in the range of from 20 to 500 nm, and preferably in the range of from 50 to 300 nm.

Further, on the substrate surface at the side on which the recordable layer will be provided, a primer layer may be provided for such purposes as improvement of surface smoothness, improvement of adhesion, and prevention of deterioration of the recordable layer.

Examples of the material for the primer layer include polymeric substances such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate, and others; and surface modifying agents such as silane coupling agents. The primer layer can be formed by a process comprising preparing a coating liquid by dissolving or dispersing the above-mentioned material in a suitable solvent, and applying the coating liquid to the substrate surface by a method such as spin coating, dip coating, extrusion coating, or the like. The thickness of the primer layer is generally in the range of from 0.005 to 20 $\mu$m, and preferably in the range of from 0.01 to 10 $\mu$m.

Further, for such purposes as enhancing scratch resistance and moisture resistance, a protective layer is preferably provided on the reflective layer. If a protective layer is provided, a print is made on the protective layer by use of a transparent coloring ink. The printing conditions are the same as those for printing on the reflective layer.

Examples of the material for use in the protective layer include inorganic substances such as SiO, $SiO_2$, $MgF_2$, $SnO_2$, and $Si_3N_4$, and organic substances such as thermoplastic resins, thermosetting resins, and UV-curable resins. The protective layer can be formed by, for example, laminating a film obtained from extrusion of a plastic on to the reflective layer via an adhesive. Alternatively, the protective layer may be formed by vacuum deposition, sputtering, coating, or the like. If the protective layer is made from a thermoplastic or thermosetting resin, the protective layer can be formed by a process comprising preparing a coating liquid by dissolving the resin in a suitable solvent, applying the coating liquid onto the reflective layer, and drying the coating layer. If the protective layer is made from a UV-curable resin, the protective layer can be formed by a process comprising applying the resin as it is or applying a coating liquid, which is prepared by dissolving the resin in a suitable solvent, onto the reflective layer, and irradiating the coating layer with UV light to cure the layer. According to the purpose, the coating liquid may further contain additives such as an antistatic agent, an antioxidant, a UV absorber, and the like. The thickness of the protective layer is generally in the range of from 0.1 to 100 $\mu$m.

The optical data storage medium of the present invention can be prepared by a conventionally known method. For example, an write-once type recordable optical data storage medium can be prepared by a method which comprises a substrate forming process in which a resin substrate having pregrooves thereon is formed by use of a stamper, a recordable layer forming process in which a recordable layer based on a dye is provided on the substrate having pregrooves thereon, a reflective layer forming process in which a reflective layer made of a metal is formed on the recordable layer based on a dye, and a protective layer forming process in which a protective layer is formed by applying a UV-curable resin onto the reflective layer and subsequently curing the resin.

EXAMPLES

The present invention is explained in further detail by way of the following Examples.

(Preparation of optical disk)

A polycarbonate substrate (having a diameter of 120 mm and a thickness of 1.2 mm, Panlite AD5503 manufactured by Teijin Ltd.), on which were formed spiral pregrooves (track pitch: 1.6 μm, pregroove width: 0.4 μm, and pregroove depth: 0.16 μm), was obtained. 2.65 g of the cyanine dye (A1) indicated below and 100 ml of 2,2,3,3-tetrafluoropropanol were mixed together, and the dye was dissolved by using an ultrasonic vibrator (1800 W) for 2 hours. In this way, a coating liquid for forming a recordable layer was prepared.

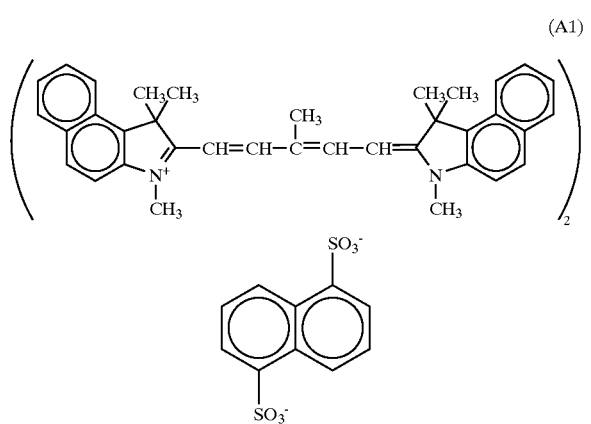

(A1)

The coating liquid was spin-coated onto the pregroove side surface of the polycarbonate substrate while varying the number of revolutions within a range of from 300 to 4000 rpm. Then, the coating was dried and thus a recordable layer based on a dye (having a thickness of about 200 nm inside the pregrooves) was formed. The conditions for forming the recordable layer were as follows: surrounding environmental temperature and humidity: 23° C. and 50% RH, temperature of the coating liquid: 23° C., temperature of the substrate: 23° C., and exhaust air flow rate: 0.1 m/sec.

Next, a reflective layer having a thickness of 150 nm was formed by sputtering Ag on the recordable layer based on a dye. Further, a UV-curable resin (SD 318 manufactured by Dainippon Ink and Chemicals Inc.) was spin-coated onto the reflective layer while varying the number of revolutions within a range of from 50 to 5000 rpm. Then, the coating was irradiated with ultraviolet light from a high-pressure mercury lamp to cure the coating. The layer thus formed served as a protective layer having a thickness of about 8 μm.

According to the above-described steps, a CD-Recordable type optical data storage medium (optical disk), which comprised a substrate, a recordable layer based on a dye, a reflective layer, and a protective layer, was prepared.

Examples 1 to 4

Prints were made on the front surface of the optical disks by intentionally varying the types and coating amounts of the inks used, as shown below. In this way, four optical disks were prepared for evaluation.

Example 1

A blue transparent ink was applied in a single coat.

Example 2

Two coats of the same blue transparent ink as that of Example 1 were applied.

Example 3

A yellow transparent ink was applied in a single coat.

Example 4

An ocher transparent ink was applied in a single coat.

Figure 2:
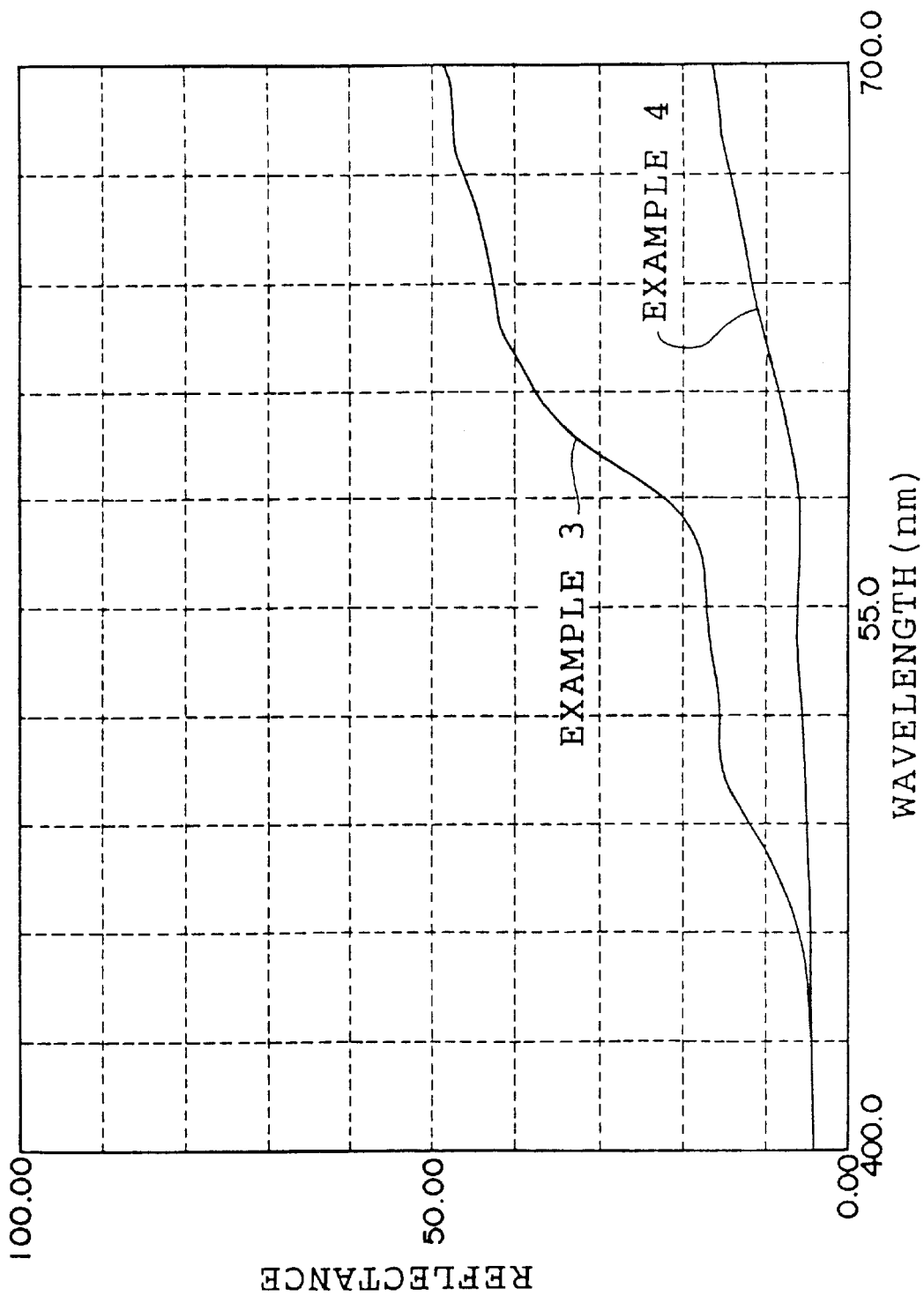
FIG. 2 is a graph illustrating the regular reflectance of the optical data storage medium of the present invention.
Figure 3:
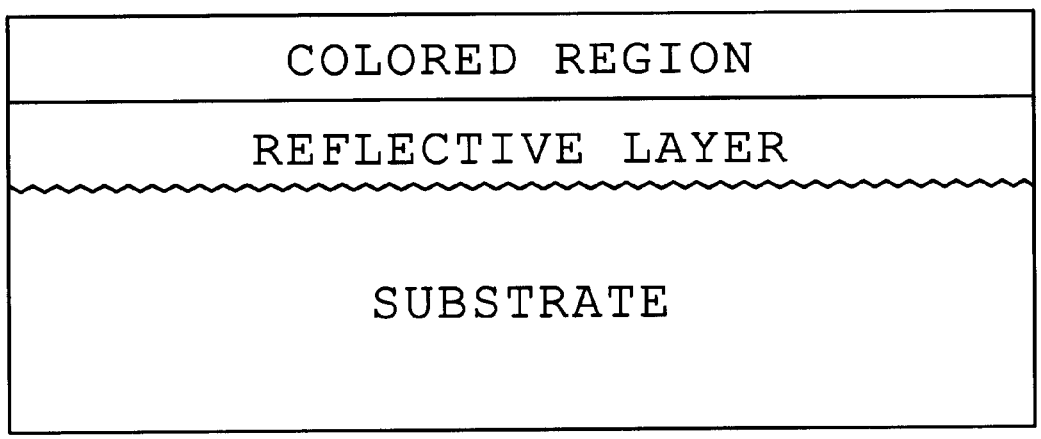
FIG. 3 is a cut-away view of the optical storage medium of the present invention having a substrate with concavities and convexities; a reflective layer with concavities and convexities; and a colored region.
Figure 4:
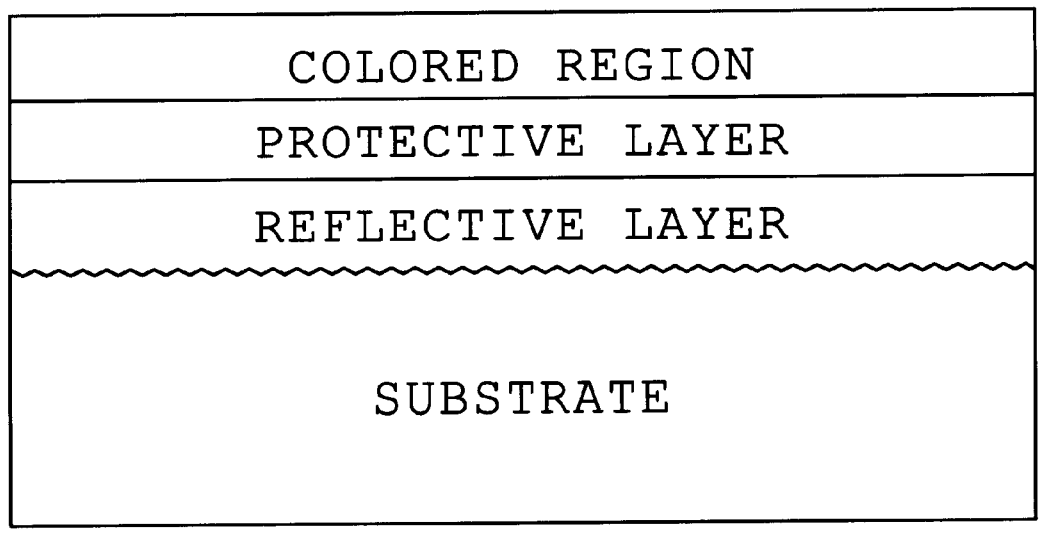
FIG. 4 is a cut-away view of the optical storage medium of the present invention having a substrate with concavities and convexities; a reflective layer with concavities and convexities; a protective layer; and a colored region.

Regular reflectance in the colored region of the optical disk with respect to light having wavelengths ranging from 400 to 700 nm (the visible region) was measured by a spectral reflectometer "UV3100" manufactured by Shimazu Corporation. The results are shown in FIGS. 2 and 3. Average regular reflectance, maximum regular reflectance, minimum regular reflectance, and coloring degree are shown in Table 1.

The term "coloring degree" means a value which quantitatively indicates a degree of coloration and is obtained by the following formula. In the present invention, this value is preferably 0.8 or more, more preferably 1.0 or more, and most preferably 1.2 or more.

Coloring degree=(maximum regular reflectance−minimum regular reflectance)/minimum regular reflectance Reference Example 1

For the purpose of reference, regular reflectance of an optical disk, which was used as a control and had no printing thereon, was also measured. Average regular reflectance, maximum regular reflectance, minimum regular reflectance, and coloring degree with respect to light having wavelengths ranging from 400 to 700 nm are shown in Table 1.

Comparative Example 1

Printing by using a pigment-based ink was carried out on the front surface of the optical disk obtained above. In this way, an optical disk for comparison was obtained. The regular reflectance with respect to light having wavelengths ranging from 400 to 700 nm (the visible region) of this optical disk for comparison was 1%, which is low. Average regular reflectance, maximum regular reflectance, and minimum regular reflectance with respect to light having wavelengths ranging from 400 to 700 nm are shown in Table 1.

Evaluation of appearance

The appearance of the optical disks obtained in the Examples and the Comparative Example was visually examined for evaluation. The criteria for the evaluation were as follows. The results are shown in Table 1.

⊚: Strong iridescent reflection due to light diffraction was observed and the surface was highly glossy.

○: Weak iridescent reflection due to light diffraction was observed and the surface was not glossy.

X: Iridescent reflection due to light diffraction was not observed.

TABLE 1

| Ink | Example 1 Blue transparent single coat | Example 2 Blue transparent two coats | Example 3 Yellow transparent single coat | Example 4 Ocher transparent single coat | Comparative Example 1 Blue opaque | Reference Example 1 With no ink applied |
|---|---|---|---|---|---|---|
| Regular reflectance | 20 | 14 | 20 | 8 | <1 | 40 |
| Maximum regular reflectance | 29 | 22 | 48 | 16 | <1 | 54 |
| Minimum regular reflectance | 13 | 6 | 4 | 4 | <1 | 31 |
| Coloring degree | 1.23 | 2.67 | 11.00 | 3.00 | — | 0.74 |
| Effect | ◎ | ◎ | ◎ | ○ | X | — |

As is apparent from Table 1, in the optical data storage media of the present invention, the coloration by the ink itself could be observed in the regions colored by the transparent coloring inks without impairment of the metallic gloss produced by the reflective layer having a high reflectance. Further, in accordance with the change in the view angle, iridescent reflection due to light diffraction could be observed.

As can be seen from Examples 1 and 2, when the same transparent coloring ink was used, average regular reflectance, maximum regular reflectance, minimum regular reflectance, and coloring degree were each different for the region where two coats were applied and the region where a single coat was applied. The difference in the coloring degree could be visually detected. Therefore, since the shade can be varied by changing the coating amount without losing metallic gloss and iridescent reflection characteristics, it is possible to create designs based on differing depths of color.

As stated above, according to the present invention, it is possible to utilize, without losing, the metallic gloss and light-diffraction-based reflection characteristics which are due to the reflective layer provided on a substrate having concavities and convexities, and to thereby provide an optical data storage medium having excellent visual effects.

What is claimed is:

1. An optical data storage medium comprising:
    a substrate having thereon concavities and convexities so that diffraction of reflected light is caused;
    a reflective layer provided on the side of the substrate which side has the concavities and convexities; and
    a colored region which is provided by applying a transparent coloring ink to at least a region of the reflective layer, the regular reflectance in the colored region with respect to light incident from the side opposite to the substrate side being within a range of from 3 to 80%.

2. An optical data storage medium according to claim 1, wherein the concavities and convexities are formed by grooves which are provided in concentric circles and have an average pitch of 0.1 to 50 μm and an average depth of 10 to 5000 nm.

3. An optical data storage medium according to claim 1, wherein the regular reflectance in the colored region with respect to light incident from the side opposite to the substrate side is controlled by controlling the coating amount of the transparent coloring ink.

4. An optical data storage medium according to claim 1, wherein the wavelength spectrum of the light reflected in the colored region with respect to light incident from the side opposite to the substrate side is controlled by controlling the absorption of the transparent coloring ink.

5. An optical data storage medium according to claim 4, wherein the wavelength spectrum of the light reflected in the colored region with respect to light incident from the side opposite to the substrate side is controlled by using as the transparent coloring ink two or more transparent coloring inks each having different absorption and applying the transparent coloring inks as plural coats.

6. An optical data storage medium according to claim 1, wherein the transparent coloring ink is a UV-curable ink.

7. An optical data storage medium comprising:
    a substrate having thereon concavities and convexities so that diffraction of reflected light is caused;
    a reflective layer provided on the side of the substrate which side has the concavities and convexities;
    a protective layer provided on the reflective layer; and
    a colored region which is provided by applying a transparent coloring ink to at least a region of the protective layer, the regular reflectance in the colored region with respect to light incident from the side opposite to the substrate side being within a range of from 3 to 80%.

8. An optical data storage medium according to claim 7, wherein the concavities and convexities are formed by grooves which are provided in concentric circles and have an average pitch of 0.1 to 50 μm and an average depth of 10 to 5000 nm.

9. An optical data storage medium according to claim 7, wherein the regular reflectance in the colored region with respect to light incident from the side opposite to the substrate side is controlled by controlling the coating amount of the transparent coloring ink.

10. An optical data storage medium according to claim 7, wherein the wavelength spectrum of the light reflected in the colored region with respect to light incident from the side opposite to the substrate side is controlled by controlling the absorption of the transparent coloring ink.

11. An optical data storage medium according to claim 10, wherein the wavelength spectrum of the light reflected in the colored region with respect to light incident from the side opposite to the substrate side is controlled by using as the transparent coloring ink two or more transparent coloring inks each having different absorption and applying the transparent coloring inks as plural coats.

12. An optical data storage medium according to claim 7, wherein the transparent coloring ink is a UV-curable ink.

13. An optical data storage medium comprising:
    a substrate having thereon concavities and convexities so that diffraction of reflected light is caused;
    a recordable layer which is writable by light and which is provided on the side of the substrate which side has the concavities and convexities;

a reflective layer provided on the recordable layer; and a colored region which is provided by applying a transparent coloring ink to at least a region of the reflective layer, the regular reflectance in the colored region with respect to light incident from the side opposite to the substrate side being within a range of from 3 to 80%.

14. An optical data storage medium according to claim 13, wherein the recordable layer is a recording layer based on a dye.

15. An optical data storage medium according to claim 13, wherein the regular reflectance in the colored region with respect to light incident from the side opposite to the substrate side is controlled by controlling the coated amount of the transparent coloring ink.

16. An optical data storage medium according to claim 13, wherein the wavelength spectrum of the light reflected in the colored region with respect to light incident from the side opposite to the substrate side is controlled by controlling the absorption of the transparent coloring ink.

17. An optical data storage medium according to claim 13, wherein the transparent coloring ink is a UV-curable ink.

* * * * *